W. C. GRAUER.
HAY PITCHER.
APPLICATION FILED DEC. 12, 1908.
943,930.
Patented Dec. 21, 1909.
3 SHEETS—SHEET 1.
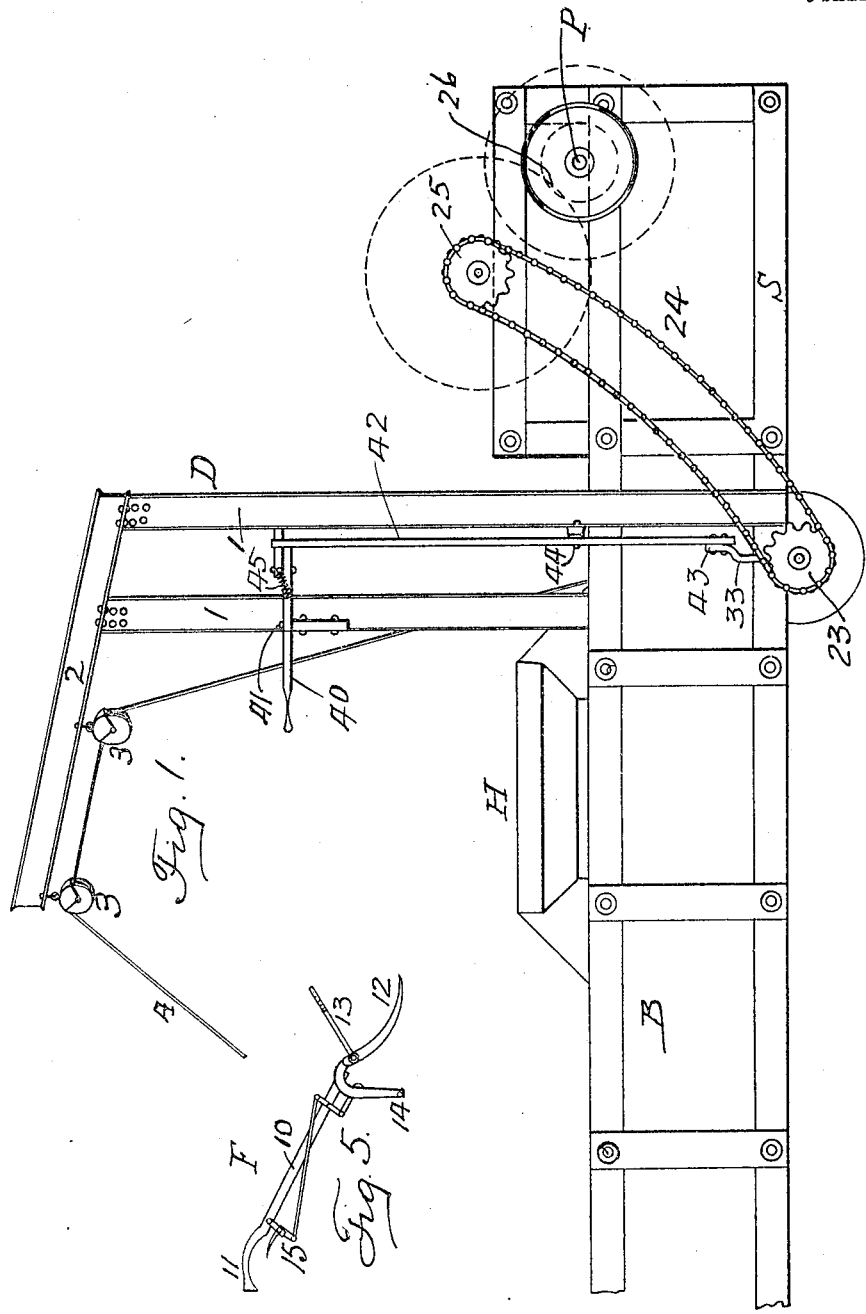
Witnesses:
N. L. Collamer
Nora Graham
Inventor:
William Conrad Grauer
By Ina C. Graham
Attorney

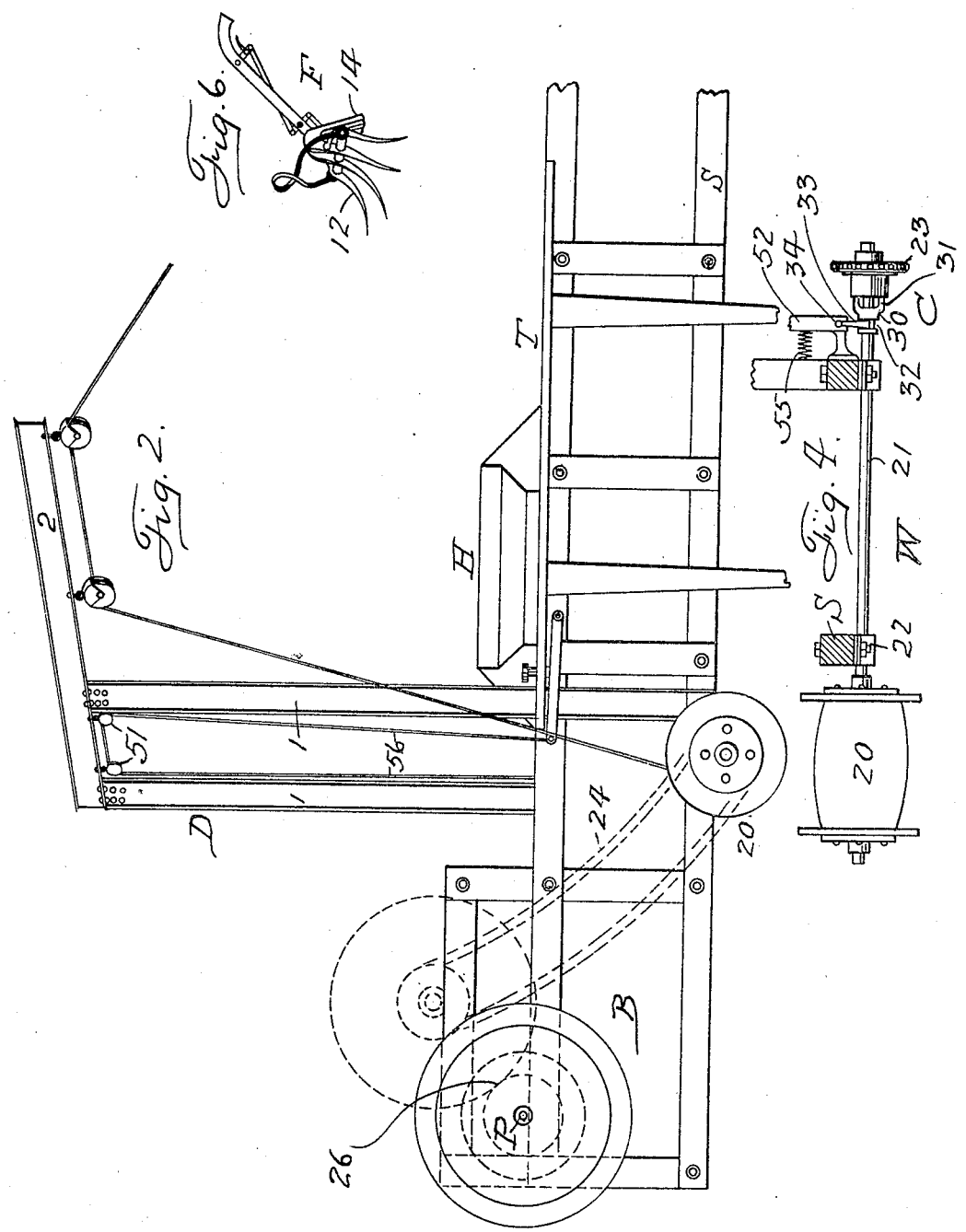

W. C. GRAUER.
HAY PITCHER.
APPLICATION FILED DEC. 12, 1908.
943,930.
Patented Dec. 21, 1909.
3 SHEETS—SHEET 3.
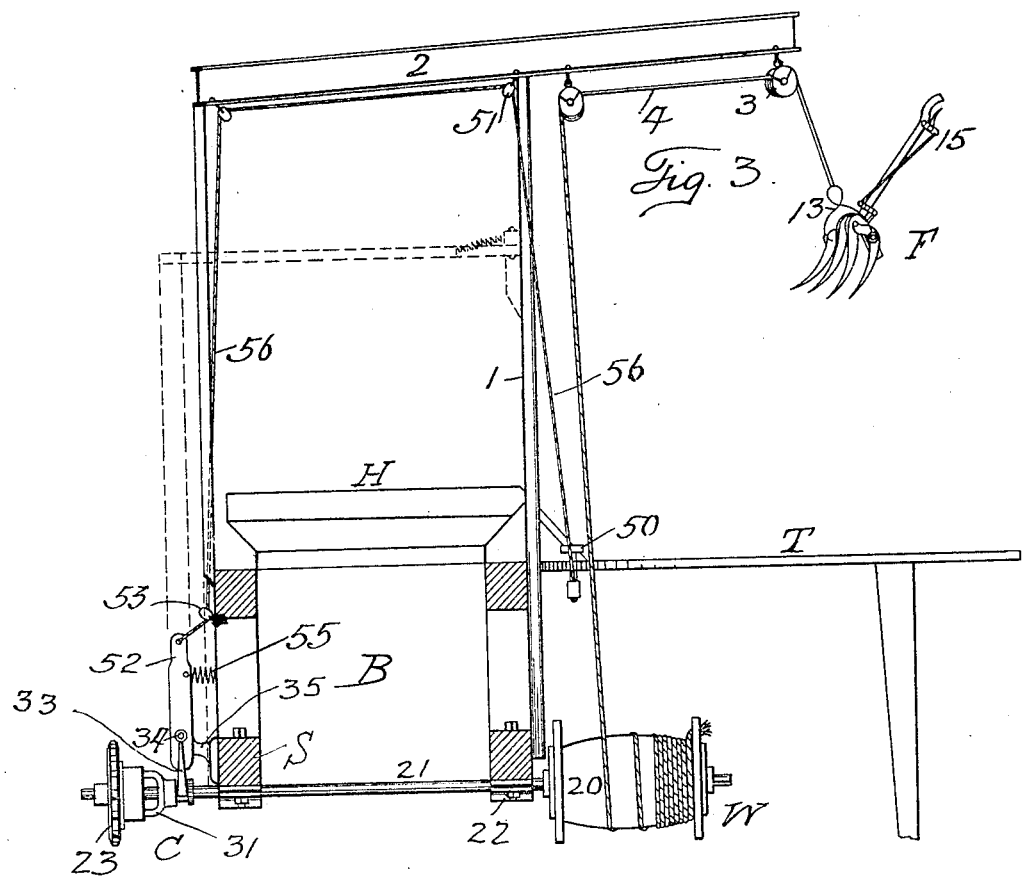
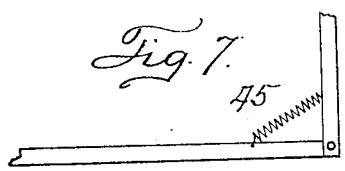
Witnesses:
N. L. Collamer
Nora Graham
Inventor:
William Conrad Grauer,
By Ina C. Graham.
Attorney.

UNITED STATES PATENT OFFICE.

WILLIAM C. GRAUER, OF PALMER, ILLINOIS.

HAY-PITCHER.

943,930. Specification of Letters Patent. Patented Dec. 21, 1909.

Application filed December 12, 1908. Serial No. 467,288.

*To all whom it may concern:*

Be it known that I, WILLIAM C. GRAUER, a citizen of the United States, and resident of Palmer, in the county of Christian and State of Illinois, have invented certain new and useful Improvements in Hay-Pitchers, of which the following is a specification.

This invention relates to presses, more especially to that class which are used for baling hay; and the object of the same is to produce a pitcher whereby the constantly moving power shaft of the baler may be employed for pitching hay to the press.

To this end the invention consists in a derrick mounted on the baler frame, a distant rake, a rope leading therefrom over pulleys on the derrick to a windlass, and clutch mechanism for throwing the windlass into or out of engagement with the rake—all as described below and as shown in the accompanying drawings in which—

Figure 1 is a front elevation of this machine, showing a hand lever for moving the clutch. Fig. 2 is a rear elevation thereof showing a foot lever for moving the clutch. Fig. 3 is a cross-section on line 3—3 of Fig. 2, showing the foot lever mechanism in full lines and the hand lever mechanism in dotted lines. Fig. 4 is a section through the frame and a detail of the windlass and clutch mechanism in elevation. Fig. 5 is a side view and Fig. 6 a perspective detail of the rake. Fig. 7 is a detail.

The letter B designates any approved type of baling press whose power shaft P runs constantly and whose internal mechanism it is not considered necessary to illustrate.

T is the feed table and H the hopper, these parts mounted on or supported by the frame work or sills S of the baler in any suitable manner.

Coming now more particularly to the present invention, the letter D designates a derrick preferably mounted upon the frame work of the baler, F is a distant rake, W a windlass, and C a clutch mechanism connecting the windlass shaft with the power. These parts will now be described in detail.

The derrick D may be of any approved construction, but for the sake of greater strength it by preference has two uprights 1 of I-beams and a fixed arm 2 attached to them and projecting obliquely across the feed table T, and this arm supports the proper pulleys 3. The fork F may also be of any approved construction, but by preference it has a frame work 10 with a handle 11, tines 12, a bail 13 to which the rope 4 is attached, a base 14 for traveling on the ground in rear of the tines, and lever mechanism 15 for dumping the hay which is carried by the tines.

The windlass W comprises a drum 20 fixed on a shaft 21 which is journaled in suitable bearings 22 in the frame work—here shown as carried beneath the sills S. On the opposite end of the shaft a sprocket wheel 23 is mounted loosely and this wheel is connected by a chain 24 with another sprocket wheel 25 which is geared at 26 to the power shaft P.

The clutch mechanism C may be of any approved type, but is here shown as consisting of a member 30 splined on the shaft 21 and having pins 31 engaging the sprocket wheel 23, said member having a groove 32 for the yoke 33 which is pivoted at 34 in a bracket 35. The operating mechanism for said clutch is located within easy reach of a workman who preferably stands upon the feed table T and passes the hay therefrom into the hopper H. In Fig. 1 I have shown said mechanism as consisting of a handle 40 pivoted at 41 on the derrick or other support and adapted to swing a lever 42 which is pivoted at 44 near its center and connected at 43 with the yoke 33 best seen in Fig. 4—hence the use of this type of lever avoids the necessity for the pivot 34 and bracket 35. A spring 45 holds the handle and lever normally in such position that the clutch members are disengaged. As best seen in Fig. 3, I may use a treadle 50 mounted in the feed table T or elsewhere within convenient reach of the operator in place of the handle mechanism just described. From said treadle a rope 56 leads over pulleys 51 on the derrick or elsewhere, under a pulley 53, and thence outward to the upper end of a lever 52 which is pivoted at 34 and carries the rake 33 as shown in this view and in Fig. 4; and here again the spring 55 holds the lever normally in such position that the clutch members are disengaged.

In using this machine one operator stands on the feed table and another manipulates the rake. The latter at a distant point in the field gathers all the hay the rake will hold, and at a proper time the other operator through the lever mechanism engages the clutch members which causes the windlass to move and its drum to wind up the rope 4. This draws in on the rake which its operator guides over the field, and the load of hay is drawn to and probably completely upward onto the feed table T. The lever mechanism is then moved to disengage the clutch, and the rake may be dumped to leave its load on the feed table. Its operator then carries it back to the starting point for a repetition of this operation, and in doing so he draws on the rope and the drum and its shaft rotates idly to permit the rope to pay out as far as necessary.

Although not illustrated, it is quite within the spirit of my invention that there may be several rakes and several distant operators, and while these rakes will have individual ropes the latter may be either all wound on a single drum or wound on the drums of individual windlasses which have their own clutches and their own operating lever therefor.

What is claimed as new is:

The combination with a baling press having a feed table and hopper; of a derrick mounted on the framework of the press and having a fixed arm extending over the hopper and carrying a pulley, a windlass journaled in the framework of the press, a driving pulley mounted loosely on its shaft and connected with a constantly revolving pulley of the baling mechanism, a clutch between said driving pulley and shaft, a lever for moving the clutch, a distant rake, and a rope leading from the windlass over said pulley to the rake.

In testimony whereof I sign my name in the presence of two subscribing witnesses, this the 8 day of December, 1908.

WILLIAM C. GRAUER.

Witnesses:
R. J. MAVARD,
M. T. LAMB.